US009405956B2

(12) United States Patent
Abe

(10) Patent No.: US 9,405,956 B2
(45) Date of Patent: Aug. 2, 2016

(54) IMAGE PROCESSING APPARATUS AND METHOD

(71) Applicant: FUJITSU LIMITED, Kawasaki-shi, Kanagawa (JP)

(72) Inventor: Narishige Abe, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 140 days.

(21) Appl. No.: 14/331,371

(22) Filed: Jul. 15, 2014

(65) Prior Publication Data

US 2015/0030216 A1 Jan. 29, 2015

(30) Foreign Application Priority Data

Jul. 26, 2013 (JP) ................. 2013-155934

(51) Int. Cl.
G06K 9/00 (2006.01)

(52) U.S. Cl.
CPC ................. *G06K 9/00067* (2013.01)

(58) Field of Classification Search
CPC ............................................. G06K 9/00067
USPC ........................................................ 382/124
See application file for complete search history.

(56) References Cited

U.S. PATENT DOCUMENTS

| 5,953,442 | A | 9/1999 | Dydyk et al. | |
| 6,226,391 | B1 | 5/2001 | Dydyk et al. | |
| 6,243,492 | B1 | 6/2001 | Kamei | |
| 2005/0201595 | A1* | 9/2005 | Kamei | G06K 9/00275 382/118 |

FOREIGN PATENT DOCUMENTS

| EP | 1522962 A1 | 4/2005 |
| JP | 10-177650 | 6/1998 |
| JP | 2001-51169 | 8/2001 |
| JP | 2004-192603 | 7/2004 |
| JP | 2007-202912 | 8/2007 |
| JP | 2009-237657 | 10/2009 |
| WO | 99/05637 | 2/1999 |
| WO | 2007/105890 A1 | 9/2007 |

OTHER PUBLICATIONS

Extended European Search Report dated Apr. 17, 2015 in corresponding European Patent Application No. 14177040.4.
Hashad et al., "A New Approach for Fingerprint Recognition Based on Mel Frequency Cepstral Coefficients", International Conference on Computer Engineering & Systems, IEEE, Dec. 2009, pp. 263-268.
Fitz et al., "Fingerprint Classification Using a Hexagonal Fast Fourier Transform", Pattern Recognition, vol. 29, No. 10, 1996, pp. 1587-1597.

\* cited by examiner

Primary Examiner — Manuchehr Rahmjoo
(74) Attorney, Agent, or Firm — Staas & Halsey LLP

(57) ABSTRACT

A processor configured to execute a process includes receiving image information including biometric information, extracting, from the image information, a first phase component image representing a phase component included in the image information, converting the image information into first frequency information and converts the first phase component image into second frequency information, extracting a first feature vector and a second feature vector respectively on the basis of amplitude information of the first frequency information and the second frequency information determined in advance, and combining the first feature vector and the second feature vector on the basis of a prescribed rule.

12 Claims, 11 Drawing Sheets

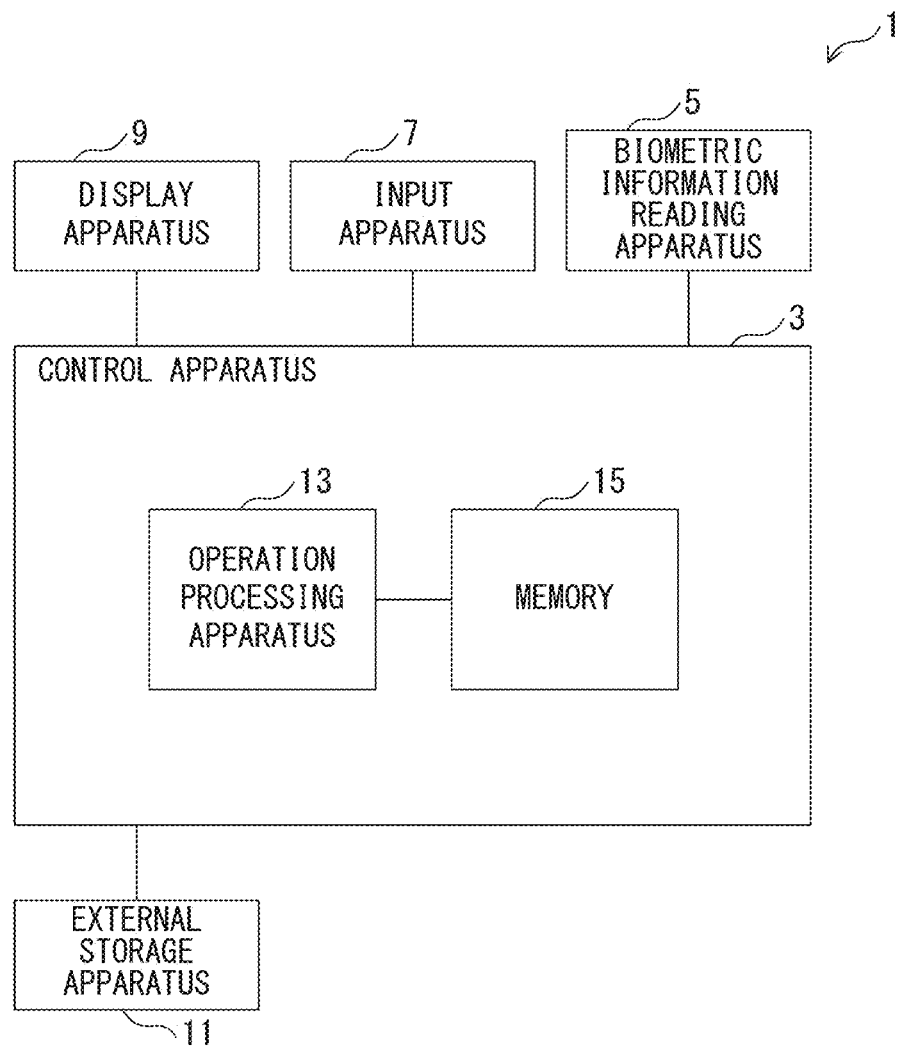
F I G. 1

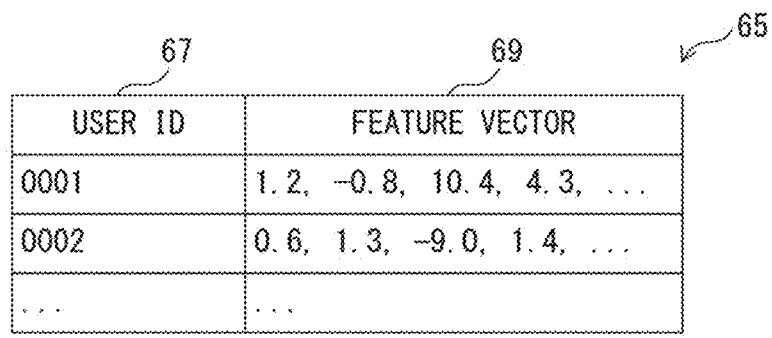
F I G. 5

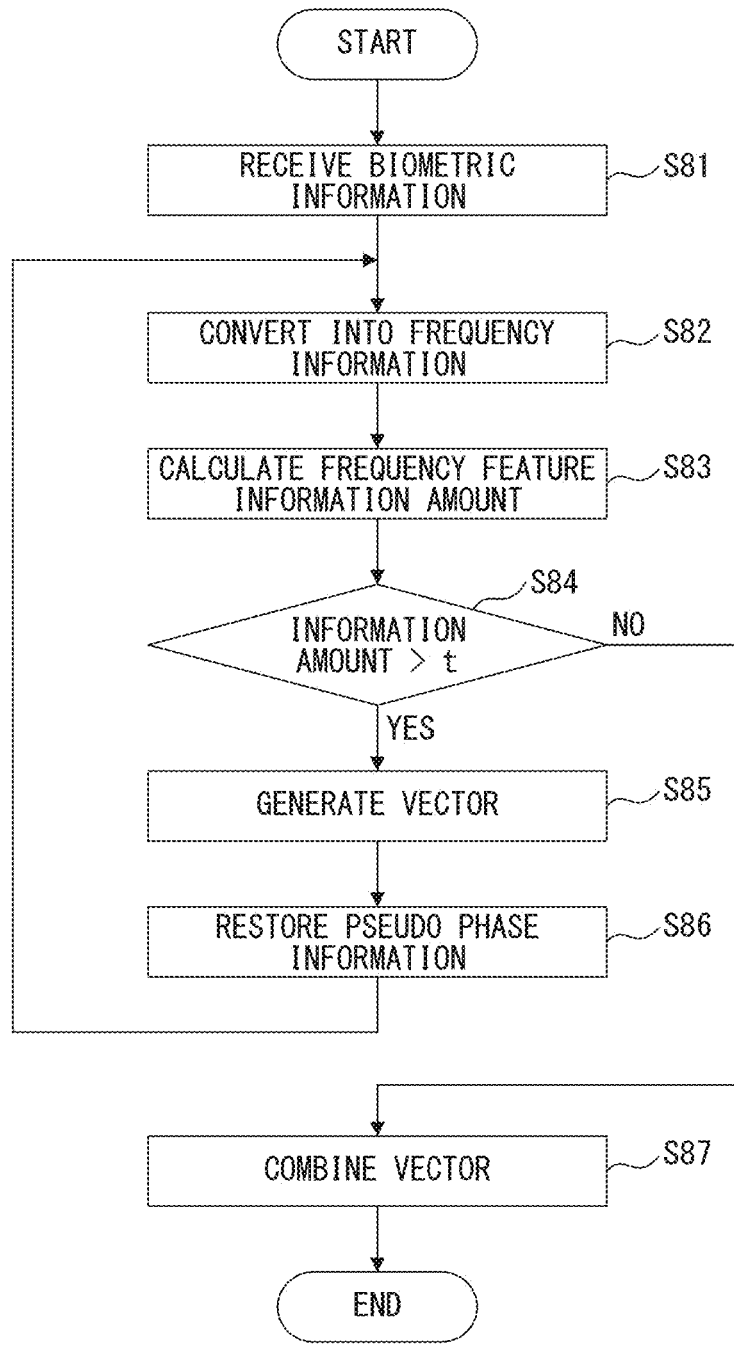
F I G. 6

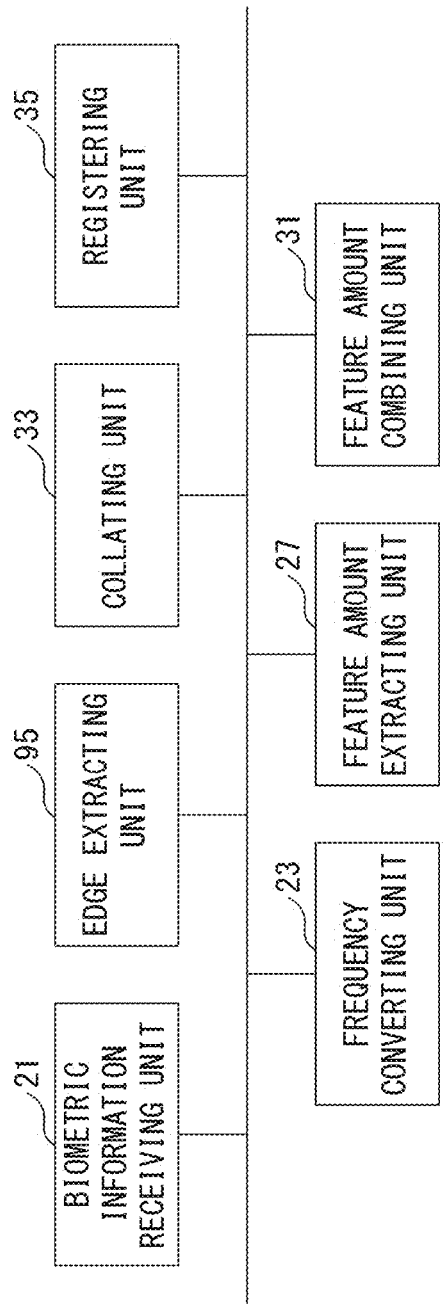
F I G. 7

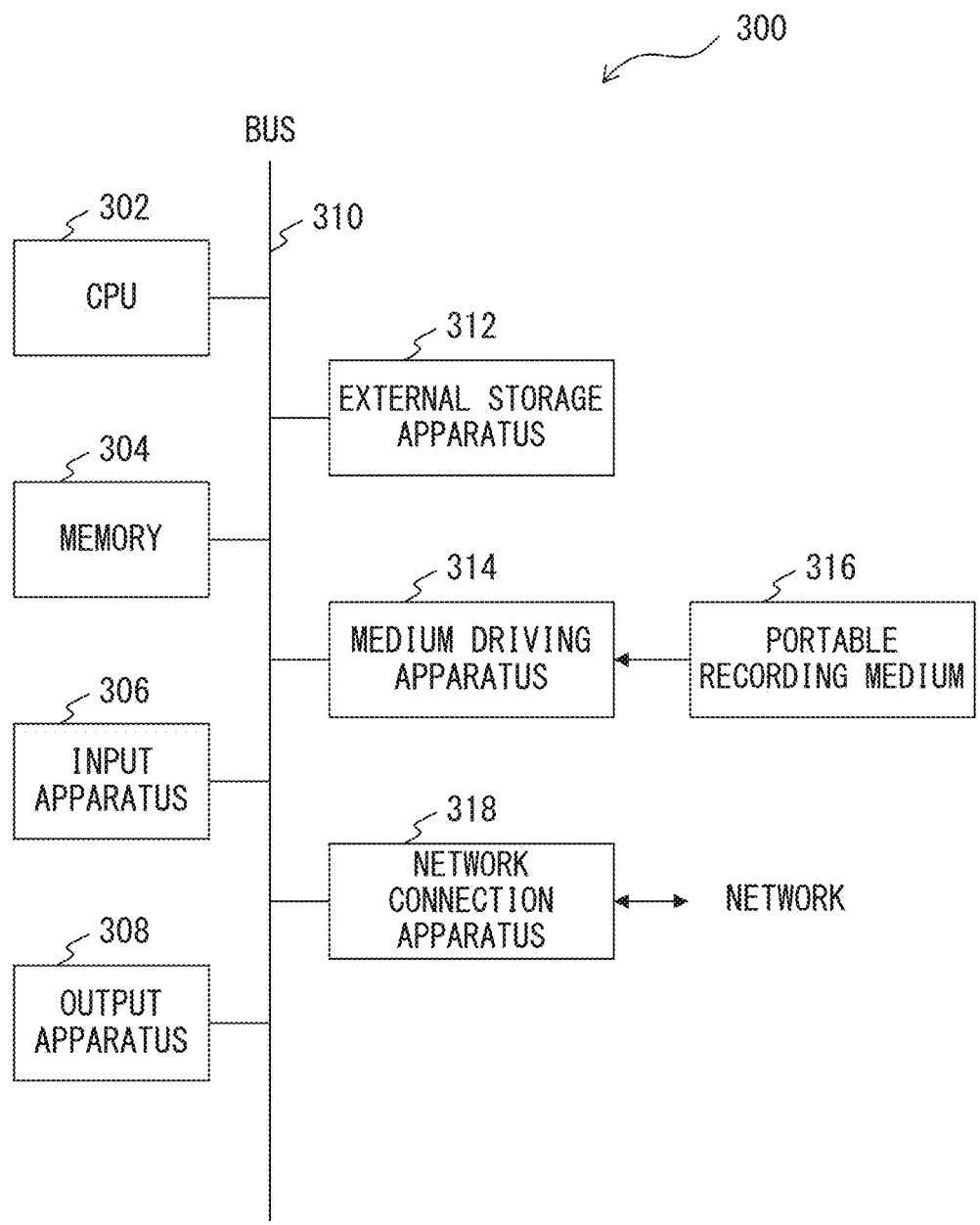
F I G. 11

IMAGE PROCESSING APPARATUS AND METHOD

CROSS-REFERENCE TO RELATED APPLICATION

This application is based upon and claims the benefit of priority of the prior Japanese Patent Application No. 2013-155934, filed on Jul. 26, 2013, the entire contents of which are incorporated herein by reference.

FIELD

The embodiments discussed herein are related to an image processing apparatus and an image processing method.

BACKGROUND

Biometric authentication that makes and uses an image from biometric information has been used in a wide variety of fields in recent years. For example, fingerprint authentication that uses a fingerprint that is a type of biometric information has been used in large-scale systems with a larger number of registered users, such as access control for buildings and rooms, border control, and national unique identification (ID) to uniquely identify citizens. In addition, fingerprint authentication has also been used in personal-use terminals such as mobile phones and personal computers (hereinafter referred to as a PC).

Meanwhile, for example, in a large-scale biometric authentication system with a larger number of users registered with biometric information, a fingerprint sensor that has a relatively large area from which a large amount of fingerprint information may be collected at one time is used in many cases. On the other hand, in a personal-use terminal such as a mobile phone and a PC, a small-sized, inexpensive, sweep-type fingerprint sensor is used in many cases.

For example, an example has been known that aims at performing collation efficiently by using a feature vector extracted from a skin pattern image and reliability information corresponding to the feature vector. A technique has also been known in which fingerprint images are classified into several patterns by obtaining a frequency image of the fingerprint image. In addition, an example of a collation apparatus has also been known in which an image including a striped pattern is obtained, a frequency spectrum of the obtained image is obtained, and from the frequency spectrum, a frequency component whose amplitude has an absolute value equal to or larger than a prescribed threshold is selected. In this collation apparatus, when the selected frequency component satisfies the quality standard for an image suitable for collation according to prescribed conditions, the image is reconstructed on the basis of the selected frequency component and collation is performed (see Patent documents 1-3).

An example has also been known in which a feature amount of the pattern of the input is broken down into the vector of its elements, an identification matrix obtained by an identification analysis respectively for each feature vector is prepared in advance, and each feature vector is projected on an identification space defined by the identification matrix to compress the dimension. In this example, after compressing the dimension of the feature vector, the obtained feature vectors are combined, and projected again by the identification matrix to calculate the feature vector. This aims at suppressing a decrease in the effective feature amount for identification in compressing the feature dimension. In addition, an example has also been known in which an edge area whose edge amount is larger than a reference value is identified in an image, and a power spectrum that represents the edge area by a frequency area is generated. This example aims at suppressing incorrect determinations in the image quality determination by identifying the hand-shaking direction of the amplitude value in the power spectrum (for example, see Patent documents 4-5).

Patent document 1: Japanese Laid-open Patent Publication No. 10-177650
Patent document 2: Japanese National Publication of International Patent Application No. 2001-511569
Patent document 3: Japanese National Publication of International Patent Application No. 2007-202912
Patent document 4: Japanese Laid-open Patent Publication No. 2004-192603
Patent document 5: Japanese Laid-open Patent Publication No. 2009-237657

SUMMARY

According to an aspect of the embodiments, an image processing apparatus including a processor configured to execute a process including receiving image information including biometric information, extracting, from the image information, a first phase component image representing a phase component included in the image information, converting the image information into first frequency information and converts the first phase component image into second frequency information, extracting a first feature vector and a second feature vector respectively on the basis of amplitude information of the first frequency information and the second frequency information determined in advance, and combining the first feature vector and the second feature vector on the basis of a prescribed rule.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram illustrating an example of the hardware configuration of a biometric authentication apparatus according to the first embodiment.

FIG. 5 is a diagram illustrating an example of the data structure of a biometric information DB according to the first embodiment.

FIG. 6 is a flowchart illustrating actions of a biometric authentication apparatus according to the first embodiment.

FIG. 7 is a block diagram illustrating functions of a biometric authentication apparatus according to the second embodiment.

FIG. 11 is a diagram illustrating the configuration of a standard computer.

DESCRIPTION OF EMBODIMENTS

Figure 2:
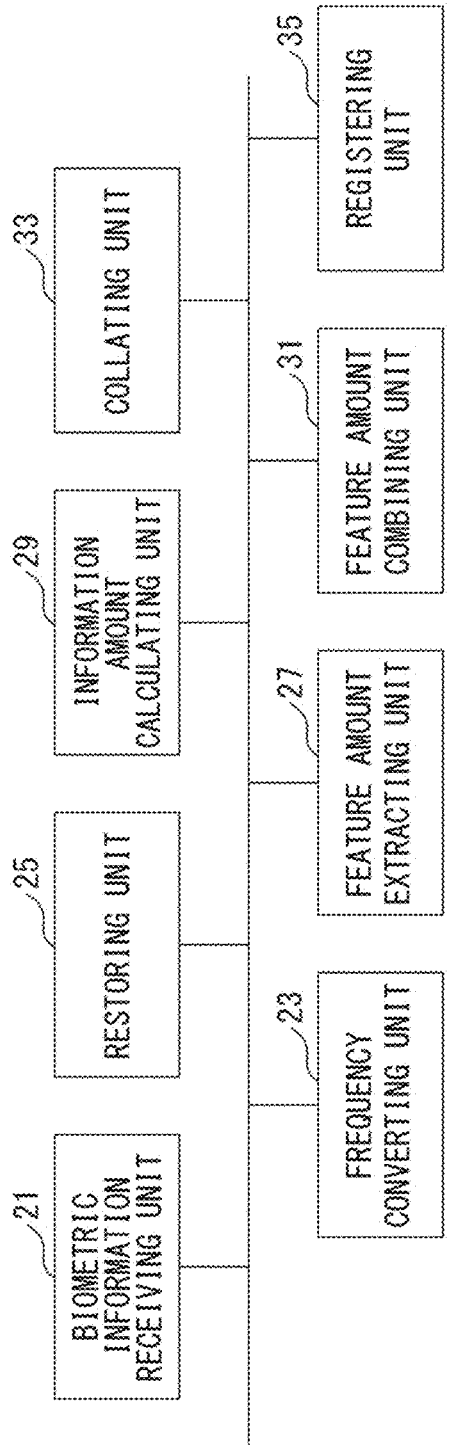
FIG. 2 is a block diagram illustrating functions of a biometric authentication apparatus according to the first embodiment.

In the image processing as described above in the biometric authentication, for example, a feature amount that is vectorized amplitude information such as a power spectrum obtained by frequency conversion of an image including biometric information is used for example. However, there is a problem wherein the feature amount that is a vectorized power spectrum has only a relatively small information amount, and it is difficult to suppress a decrease in the authentication accuracy. Meanwhile, there is a problem wherein the phase information obtained by frequency conversion of an image including biometric information is poor in the aggregation of information, and it is difficult to efficiently vectorize it as it is.

Preferred embodiments of the present invention will be explained with reference to accompanying drawings.

(First Embodiment) Thereinafter, a biometric authentication apparatus 1 according to the first embodiment is explained with reference to the drawings. The biometric authentication apparatus 1 is an example of an image processing apparatus, and it is an apparatus that obtains biometric information that is made into an image, performs image processing for it, and performs registration and collation. Biometric information is, mainly, a fingerprint, a palm print, a blood vessel (vein) pattern, or the like. Hereinafter, in particular, a case in which an image of a fingerprint is used as biometric information is explained.

FIG. 1 is a diagram illustrating an example of the hardware configuration of the biometric authentication apparatus 1 according to the first embodiment. As illustrated in FIG. 1, the biometric authentication apparatus 1 includes a control apparatus 3, a biometric information reading apparatus 5, an input apparatus 7, a display apparatus 9, and an external storage apparatus 11.

The control apparatus 3 is an apparatus that controls the actions of the biometric authentication apparatus 1, and includes an operation processing apparatus 13 and a memory 15. The operation processing apparatus 13 is an apparatus that includes at least one processor to perform processing in relation to the control of the biometric authentication apparatus 1.

The memory 15 is a semiconductor storage apparatus such as Read Only Memory (ROM), Random Access Memory (RAM), or the like. The memory 15 may store, for example, a program to control the actions of the biometric authentication apparatus, and information and the like used for processing, such as biometric authentication information of the registered users. The operation processing apparatus 13 may control the biometric authentication apparatus 1 by reading and executing the program stored in the memory 15.

The biometric information reading apparatus 5 is an apparatus that makes and outputs an image from biometric information input by the user, such as a fingerprint sensor for example. As the detecting method in a case in which a fingerprint sensor is used for the biometric information reading apparatus 5, any method using for example an electrostatic capacitance system, a heat sensitive system, an electric field system, an optical system, an ultrasound system, and the like, may be used.

The input apparatus 7 is an apparatus for the user to input information, such as, for example, a keyboard, a touch panel, a mouse and the like. The display apparatus 9 is an apparatus such as a liquid crystal display apparatus for example. The display apparatus 9 displays guidance for the user, for example. The external storage apparatus 11 is a storage apparatus such as a hard disk apparatus for example.

Figure 3:
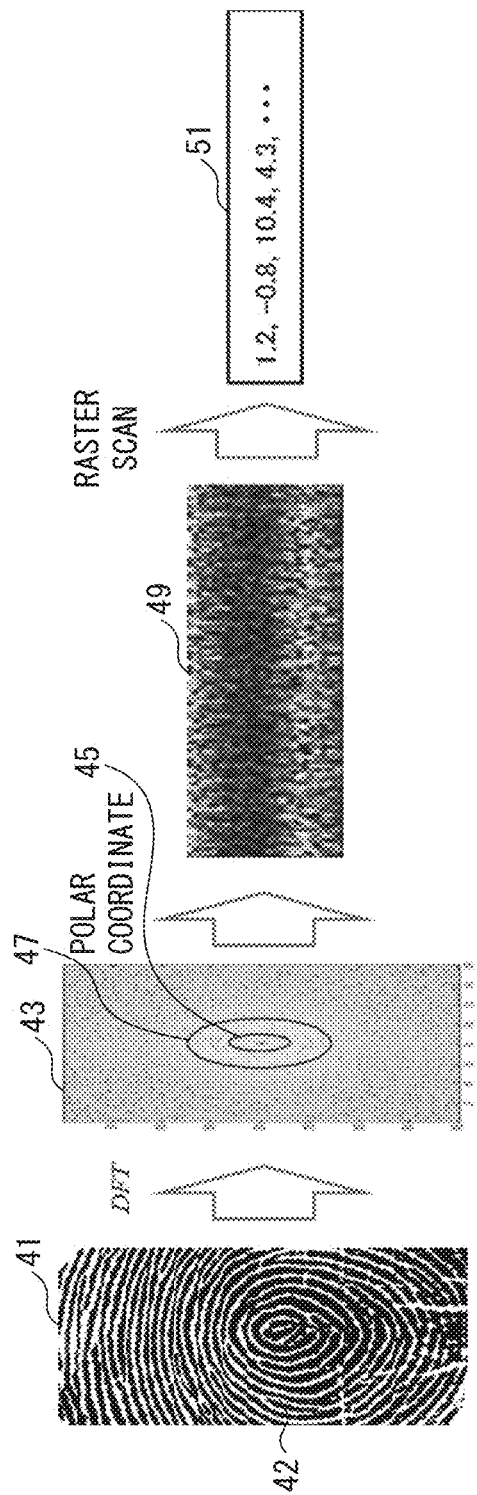
FIG. 3 is a diagram explaining the calculation of a frequency feature amount according to the first embodiment.
Figure 4:
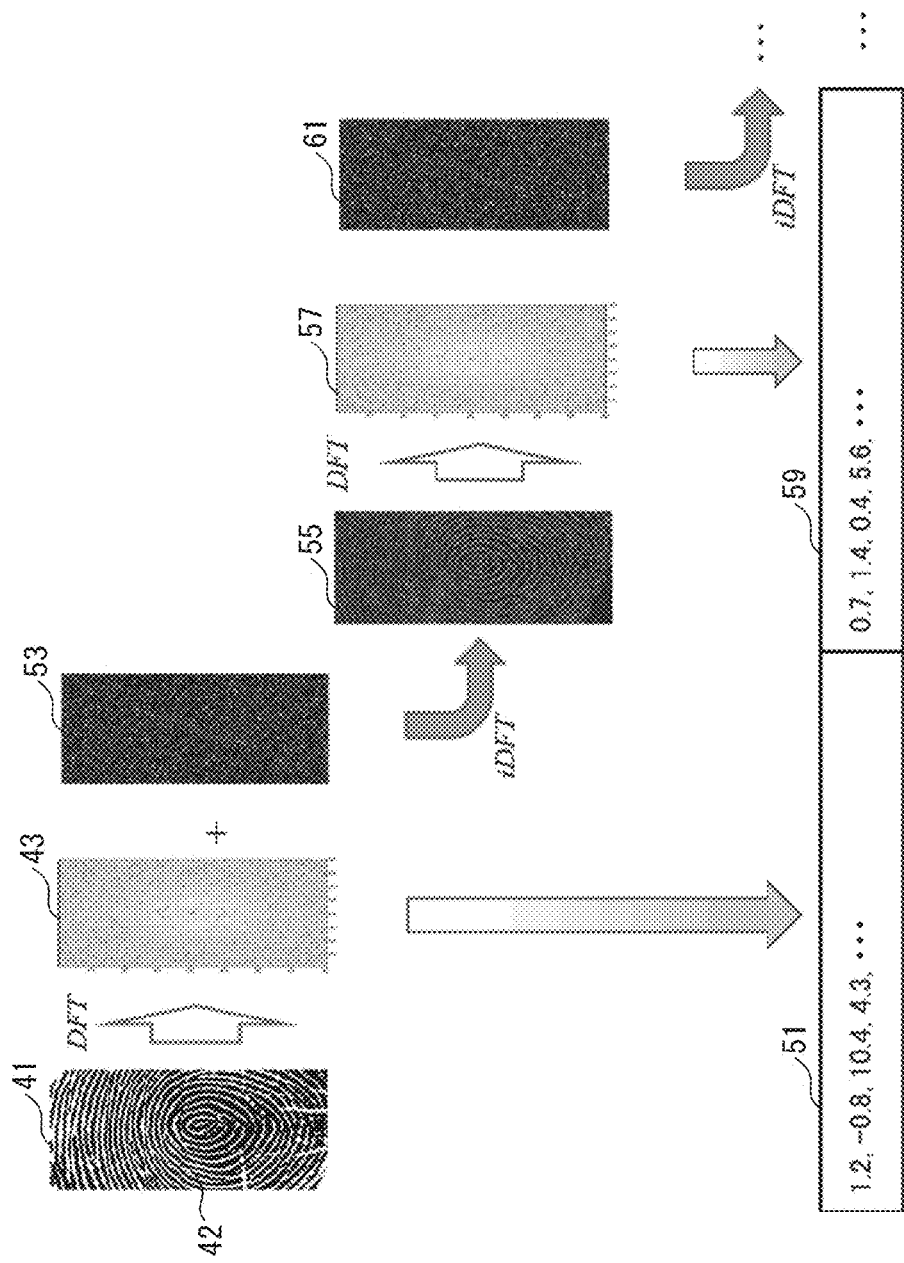
FIG. 4 is a diagram explaining vectorization of a frequency feature amount according to the first embodiment.

FIG. 2 is a block diagram illustrating functions of the biometric authentication apparatus 1. FIG. 3 is a diagram explaining the calculation of a frequency feature amount. FIG. 4 is a diagram explaining vectorization of a frequency feature amount. As illustrated in FIG. 2, the biometric authentication apparatus 1 has the functions of a biometric information receiving unit 21, a frequency conversion unit 23, a restoring unit 25, a feature amount extracting unit 27, an information amount calculating unit 29, a feature amount combining unit 31, a collating unit 33, and a registering unit 35.

The biometric information receiving unit 21 receives an image including a fingerprint of the user for example, generated by the biometric information reading apparatus 5. At this time, the biometric information receiving unit 21 extracts an area in which the fingerprint is captured, from the fingerprint image. That is, the biometric information receiving unit 21 divides the received image into w×w (the number of pixels, w is an integer) blocks, and calculates statistics such as the average and the distribution of the pixel values for each block unit. For example, as the value of the number of pixels w, in the case for example of a fingerprint image obtained by a 500 dpi sensor with an average ridge interval of 8 pixels (px), a value such as 8 px×8 px or 16 px×16 px is used.

The biometric information receiving unit 21 extracts the foreground and the background from the fingerprint image using a threshold set in advance. That is, for example, when the image of the subject has a pixel value smaller than the threshold, the block whose calculated average of pixel values is smaller than the threshold is regarded as the foreground, and the other is regarded as the background. For example, when the pixel value of the foreground is close to 0 and the pixel value of the background is close to 255, the threshold may be set as 128 for example. As described above, for example, as illustrated in FIG. 3, an original image 41 is obtained. In the original image 41, a ridge line 42 corresponds to the dark (or the black) part.

The frequency conversion unit 23 performs frequency conversion of for example an image read at the biometric information receiving unit 21 and an image restored at the restoring unit 25, and the like, by Discrete Fourier Transform: DFT and the like for example.

For example, the frequency conversion unit 23 converts an image that is readout by the biometric information receiving unit 21 and subjected to the process described above into frequency information. That is, the frequency conversion unit 23 applies Discrete Fourier Transform to the original image 41 of the fingerprint image for example, to convert it into frequency information (amplitude information and phase information). For example, a power spectrum image 43 in FIG. 4 is an example of amplitude information, and a phase information image 53 is an example of phase information.

Frequency information F(u, v) is expressed by Expression 1 below.

$$F(u, v) = \sum_{x=0}^{M-1}\sum_{y=0}^{N-1} f(x, y)e^{-2\pi i\left(\frac{ux}{M}+\frac{uy}{N}\right)} \quad \text{(Expression 1)}$$

$$u = 0, \ldots, M-1; v = 0, \ldots, N-1$$

Meanwhile, integers N, M are integers representing the number of pixels of the number of blocks in the x direction and the y direction, respectively. In addition, variables x, y indicate the plane coordinates in the fingerprint image, and variables u, v indicate the horizontal-direction frequency and the vertical-direction frequency, respectively.

The feature amount extracting unit 27 extracts and vectorizes a characteristic part from amplitude information in the frequency information converted by the frequency conversion unit 23. Specifically, first, the feature amount extracting unit 27 extracts only a frequency band determined in advance (hereinafter, referred to as a particular frequency band) in relation to power spectrum information such as for example the power spectrum image 43 obtained by the frequency conversion unit 23, and performs polar coordinate conversion. The power spectrum of the particular frequency band is referred to as a particular frequency component. The power spectrum P(r, θ) in the polar coordinates is expressed by Expression 2 below.

$$P(r,\theta) = |F(r\cos\theta, r\sin\theta)|$$

$$\omega_L < R < \omega_H, 0 < \theta < \pi \quad \text{(Expression 2)}$$

Frequencies $\omega_L$, $\omega_H$ represent an area in which features of the biometric information are concentrated. For example, as frequency $\omega_L$ a frequency that is the average of power spectrum P(r, θ)−standard deviation×2 may be selected, and as frequency $\omega_H$ a frequency that is the average of power spectrum P(r, θ)+standard deviation×2 may be selected.

According to the process described above, the upper half of FIG. 3 in the power spectrum included in a first boundary 45 to the second boundary 47 of the power spectrum image in FIG. 3 for example is extracted. In addition, by polar coordinate conversion of the extracted power spectrum, a polar coordinate image 49 in FIG. 3 is obtained. The polar coordinate image 49 is an image representing the power spectrum P(r, θ) using a gray scale, taking θ in the horizontal direction and r in the vertical direction for example.

Meanwhile, when performing the polar coordinate conversion, an algorithm such as bilinear interpolation may be used to lessen the discontinuity of the data, as indicated by Expression 3 below.

$$P(p_x, p_y) = ([p_x] + 1 - p_x \quad p_x - [p_x])$$

$$\begin{pmatrix} |F([p_x], [p_y])| & |F([p_x]+1, [p_y])| \\ |F([p_x], [p_y]+1)| & |F([p_x]+1, [p_y]+1)| \end{pmatrix}$$

$$\begin{pmatrix} [p_y]+1-p_y \\ p_y = [p_y] \end{pmatrix}$$

$$p_x = r\cos\theta, \; p_y = r\sin\theta$$

(Expression 3)

The feature amount extracting unit 27 serializes the data in one dimension in the same manner as a raster scan the raster scan, in relation to the obtained polar coordinate image 49. Meanwhile, integer $N_r$ represents the number of divisions of the frequency component, and for example, a numerical value such as 128 or 256 is used. Integer $N_\theta$ represents the number of divisions of the direction component, and for example, a numerical value such as 128 or 256 is used. Meanwhile, i-th component BV(i) of the feature vector at this time is expressed by Expression 4 below.

$$BV(i) = P([i/N_\theta], i \bmod N_\theta)$$

$$0 < i < N_r N_\theta \quad \text{(Expression 4)}$$

Here, $N_r$ is the number of divisions of the frequency component, and $N_\theta$ is the number of divisions of the direction component.

As described above, the feature amount extracting unit 27 extracts a frequency feature vector 51 illustrated in FIG. 3 and FIG. 4 for example, from amplitude information (for example, the power spectrum image 43) included in frequency information. Meanwhile, the frequency feature vector 51 may be viewed as a feature vector based on amplitude information of the original image 41.

The restoring unit 25 performs inverse frequency conversion of phase information in the frequency image converted at the frequency conversion unit 23, to restore it to the original space information spuriously. Specifically, inverse DFT is performed using "0" for the real part of the function subjected to inverse DFT, and using phase information Phase (r, θ) for its imaginary part, to restore the original space information. For example, as illustrated in FIG. 4, the restoring unit 25 converts a phase information image 53 by inverse DFT, to generate an inverse conversion image 55.

At this time, phase information Phase (r, θ) is expressed by Expression 5 below.

$$\text{Phase}(r, \theta) = \tan^{-1}\left(\frac{\text{imag}(F(r\cos\theta, r\sin\theta))}{\text{real}(F(r\cos\theta, r\sin\theta))}\right) \quad \text{(Expression 5)}$$

Here, real (*) represents the real part of *, and imag(*) represents the imaginary part of *.

Inverse DFT using phase information Phase (r, θ) expressed by Expression 5 is represented by Expression 6 below.

$$f(x, y) = \frac{1}{N}\frac{1}{M}\sum_{u=0}^{M-1}\sum_{v=0}^{N-1}F(u, v)e^{2\pi i\left(\frac{xu}{M}+\frac{yu}{N}\right)} \quad \text{(Expression 6)}$$

$$F(u, v) = 0 + iFi(u, v)$$

Meanwhile, Fi(u, v) may be the imaginary number component of F(u, v). At this time, F(u, v) is expressed by Expression 7 below.

$$F(u, v) = i\tan^{-1}\left(\frac{\text{imag}(F(u, v))}{\text{real}(F(u, v))}\right) \quad \text{(Expression 7)}$$

Meanwhile, the frequency conversion unit 23 further converts the inverse conversion image 55 by DFT to generate a power spectrum image 57. The feature amount extracting unit 27 extracts a particular frequency component in the power spectrum image 57 and performs polar coordinate conversion and further performs the raster scan, to extract a pseudo frequency feature vector 59, in the same manner as the process for the power spectrum image 43. The pseudo frequency feature vector 59 extracted at this time is information that is phase information of the original image 41 extracted spuriously as a frequency feature vector, and may be viewed as a feature vector on the basis of phase information of the original image 41.

The information amount calculating unit 29 calculates the total sum of the power spectrums of amplitude information in the frequency information converted by the frequency conversion unit 23. Specifically, the total sum of the absolute values of amplitude information of the respective pixels are calculated as frequency feature information amount Pto.

During the period when frequency feature information amount Pto>t (t is a constant number determined in advance), the frequency conversion unit 23, the restoring unit 25, and the feature amount extracting unit 27 repeat the procedure described above to extract a frequency feature vector spuriously from phase information included in frequency information.

The feature amount combining unit 31 combines a frequency feature vector 51, a pseudo frequency feature vector 59, and the like extracted by the feature amount extracting unit 27. Specifically, for example, the generated frequency vector 51 and the pseudo frequency feature vector 59 are arranged sequentially to make one feature vector. At this time, a feature vector including at least one pseudo frequency feature vector generated on the basis of phase information of the original image 41 converted by the frequency conversion unit 23 is generated.

FIG. 5 is a diagram illustrating an example of the data structure of the biometric information DB 65. As illustrated in FIG. 5, the biometric information DB 65 is an example of data stored for example in the external storage apparatus 11 or the memory 15, and it is data associated with a user ID 67 and a feature vector 69. The user ID 67 is expressed by data of 4 bits for example. The feature vector 69 represents a biometric feature amount, and it is one feature vector combined with the feature amount combining unit 31. The feature vector 69 may be data with a fixed length, such as 32 bits for example.

The collating unit 33 determines whether the feature vector generated at the feature amount combining unit 31 matches the feature vector 69 in the biometric information DB 65, and when they match, identifies which user's information the biometric information corresponding to the feature vector is. Meanwhile, at this time, for example, a display to prompt the input of the user ID may be displayed on the display apparatus 9, and the user ID input through the input apparatus 7 may be obtained. In this case, in the collation, the feature vector 69 registered in association with the input user ID is collated with the generated feature vector, and when it is determined that they match, the user may be identified as the registered user.

In the identification, when the number of components of the feature vectors match, and the distance calculated from two vectors are within a prescribed value, a determination may be made that the two vectors match.

The registering unit 35 associates the feature vector generated as described above with the user ID of the corresponding biometric information and registers it in the biometric information DB 65. Meanwhile, at this time, for example, a display to prompt the input of the user ID may be displayed on the display apparatus 9, and the user ID input through the input apparatus 7 may be obtained. For example, when the extracted feature vector is not registered in the biometric information DB 65, the extracted feature vector may be registered newly as the feature vector 69.

Hereinafter, actions of the biometric authentication apparatus 1 are further explained with reference to FIG. 6. FIG. 6 is a flowchart illustrating actions of the biometric authentication apparatus 1. The respective processes in the biometric authentication apparatus 1 are performed by the execution of a prescribed control program by the operation processing apparatus 13, but hereinafter, explanation is given assuming that the respective units illustrated in FIG. 2 perform the process.

As illustrated in FIG. 6, the biometric information receiving unit 21 receives biometric information through the biometric information reading apparatus 5 (S81). At this time, for example, biometric information that has already been stored in the external storage apparatus 11 or the like, or biometric information received through a transmitting/receiving unit that performs transmission/reception of information with the outside, described later, may be used. Meanwhile, the biometric information receiving unit 21 generates for example the original image 41 by performing a prescribed process explained with reference to FIG. 2.

The frequency conversion unit 23 performs frequency conversion of the original image 41, according to Expression 1 for example (S82). The information amount calculating unit 29 calculates frequency feature information amount Pto, for example, on the basis of amplitude information included in the frequency information subjected to frequency conversion (S83). When frequency feature information amount is Pto>t (S84: YES), the feature amount extracting unit 27 generates a feature vector on the basis of amplitude information included in the frequency information that is space information of the original image 41 subjected to frequency conversion (S85). The restoring unit 25 performs inverse frequency conversion of phase information of the frequency information mentioned above to restore space information (pseudo phase information) (S86), and brings the process back to S82.

When frequency feature information amount is not Pto>t (S84: NO), the feature amount combining unit 31 combines the extracted feature vectors such as the frequency feature vector 51, the pseudo frequency feature vector 59, and the like (S87). At this time, the biometric authentication apparatus 1 may perform collation or registration of data, and terminates the process.

As explained in detail above, in the biometric authentication apparatus 1 according to the first embodiment, the biometric information receiving unit 21 receives biometric information, extracts a fingerprint image for example, and the frequency conversion unit 23 performs frequency conversion of the fingerprint image. The feature amount extracting unit 27 extracts the particular frequency component of amplitude information in the frequency information that has been subjected to the frequency conversion, performs polar coordinate conversion and a process to lessen the discontinuity and the like, and extracts the frequency feature vector in one dimension by the raster scan. The information amount calculating unit 29 calculates the total sum of the amplitude information as frequency feature information amount Pto, and when it is larger than prescribed value t, continues the feature vector extracting process.

Meanwhile, the restoring unit 25 performs inverse frequency conversion of phase information in the frequency information to restore it as space information, and frequency conversion is performed by the frequency conversion unit 23, to generate frequency information on the basis of the phase information. The feature amount extracting unit 27 generates a pseudo frequency feature vector on the basis of amplitude information in the generated frequency information. The feature amount combining unit 31 generates a feature vector by combining a frequency feature vector on the basis of amplitude information in frequency information that is the fingerprint image subjected to frequency conversion, and at least one pseudo frequency feature vector on the basis of phase information in the frequency information.

The collating unit 33 may be configured to perform biometric authentication with the generated feature vector. The registering unit 35 associates the generated feature vector with the user ID and may store it as the biometric information DB 65 in the memory 15 or the external storage apparatus 11.

As described above, for example, phase information of an image represents its local change of pixel values. Therefore, in an image such as biometric information that includes a characteristic line, phase information concentrates on the edge area of its line. Therefore, by performing inverse DFT assuming the real part is "0" and setting the calculated phase information in the imaginary part, only the phase information may be spuriously restored as space information.

By applying DFT again to the restored image and vectorizing the power spectrum, phase information is spuriously vectorized. Furthermore, by repeating the process of pseudo vectorization of phase information, it becomes possible to reflect phase information more, in generating the feature vector from the image including biometric information. Thus, phase information that has been difficult to vectorize efficiently in a fingerprint image and the like may be vectorized efficiently. By vectorizing the phase information efficiently, a decrease in the authentication accuracy in biometric authentication with a feature vector may be suppressed, and there is also an effect of reducing the authentication information.

(Second Embodiment) Hereinafter, with reference to FIG. 7 through FIG. 9, a biometric authentication apparatus according to the second embodiment is explained. In the second embodiment, regarding the same configurations and actions as in the first embodiment, redundant explanations are omitted. The hardware configuration of the biometric authentication apparatus according to the second embodiment is the same as the biometric authentication apparatus. In the present embodiment, an image obtained by edge detection in the original image 41 is used as a phase component image.

FIG. 7 is a block diagram illustrating functions of a biometric authentication apparatus according to the second embodiment. FIG. 8 is a diagram explaining the vectorization of the frequency feature amount. As illustrated in FIG. 7, the biometric authentication apparatus according to the second embodiment has functions of a biometric information receiving unit 21, a frequency conversion unit 23, an edge extracting unit 95, a feature amount extracting unit 27, an information amount calculating unit 29, a feature amount combining unit 31, a collating unit 33 and a registering unit 35.

The edge extracting unit 95 detects an edge area of for example the original image 41 read by the biometric information reading apparatus 5 and processed by the biometric information receiving unit 21. Specifically, an edge area of the image is detected using a Sobel filter, a Laplacian filter, a Prewitt filter, Canny edge detection, and the like.

Figure 8:
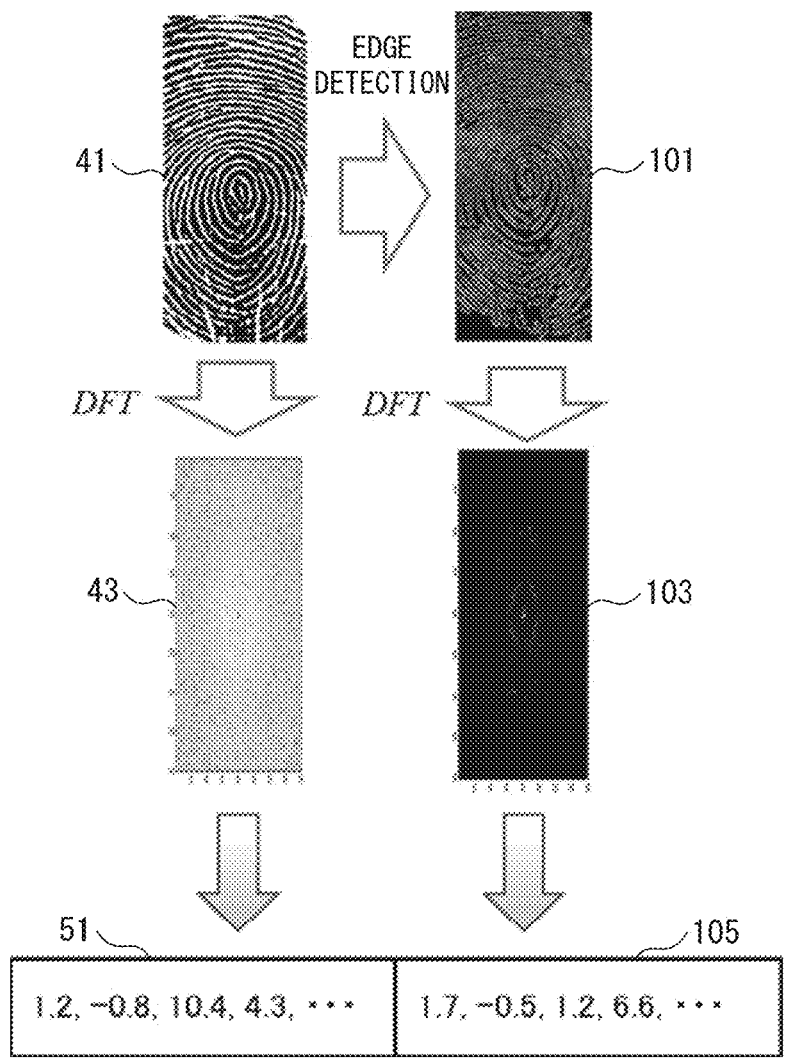
FIG. 8 is a diagram explaining vectorization of a frequency feature amount according to the second embodiment.

An edge image 101 of FIG. 8 is an image detected by a method as mentioned above. In the edge image 101, an edge 102 between a ridge line and a valley line is expressed by a light-colored line. The frequency conversion unit 23 performs frequency conversion of the edge image 101 to generate the power spectrum image 103. The feature amount extracting unit 27 extracts a frequency feature vector 105 by performing polar coordinate conversion of the particular frequency component of the power spectrum image 103 and performing the raster scan.

The feature amount combining unit 31 combines a frequency feature vector 51 generated from amplitude information of the original image 41 and a frequency feature vector 105 generated from the edge image 101. The combining may be performed by making one vector in which the components of the two vectors are sequentially connected in an order determined in advance. The collating unit 33 performs collation on the basis of a feature vector including the frequency feature vector 51 and the frequency feature vector 105. The registering unit 35 associates with the user ID and stores the feature vector in which the frequency feature vector 51 and the frequency feature vector 105 are combined.

Hereinafter, actions of the biometric authentication apparatus according to the second embodiment is explained. FIG. 9 is a flowchart illustrating actions of the biometric authentication apparatus according to the second embodiment. The respective processes in the biometric authentication apparatus 1 are performed by the execution of a prescribed control program by the operation processing apparatus 13, but hereinafter, the explanation is given assuming that the respective units illustrated in FIG. 7 perform the process.

Figure 9:
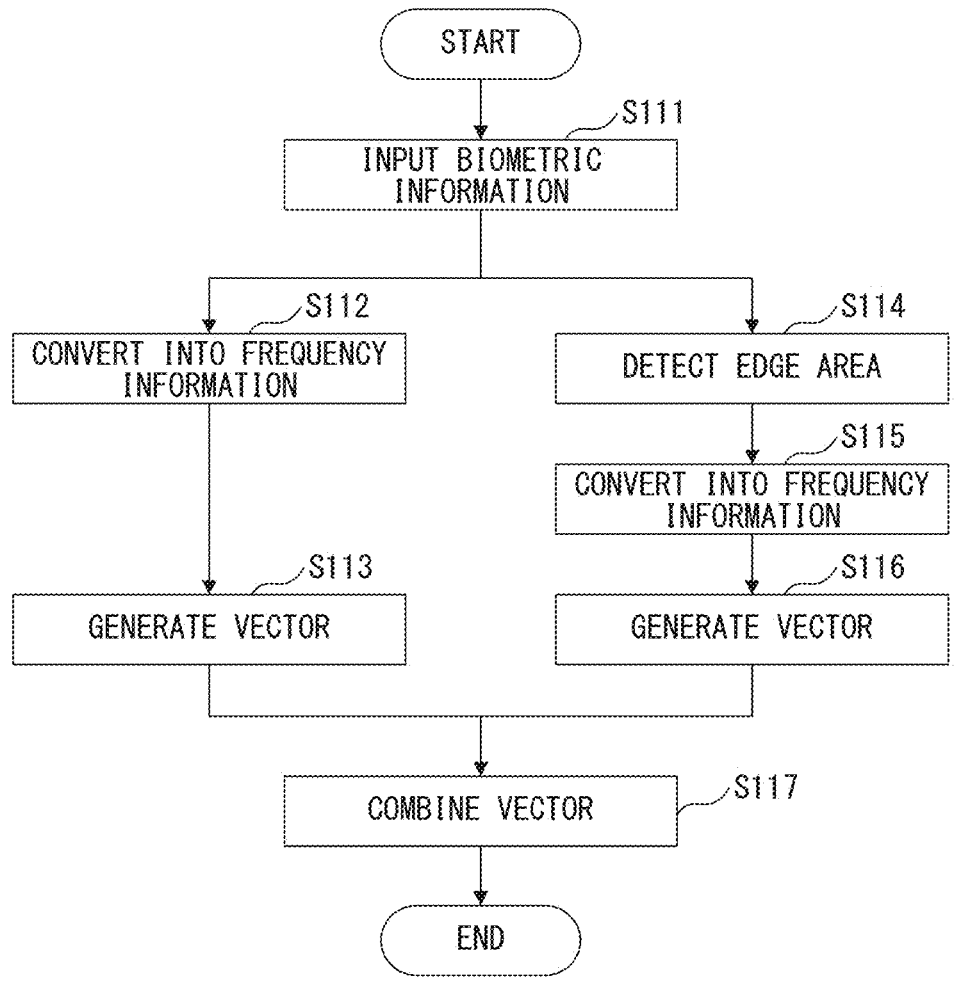
FIG. 9 is a flowchart illustrating actions of a biometric authentication apparatus according to the second embodiment.

As illustrated in FIG. 9, the biometric information receiving unit 21 receives biometric information through the biometric information reading apparatus 5 (S111). At this time, for example, biometric information that has already been stored in the external storage apparatus 11 or the like, or biometric information received through a transmitting/receiving unit that performs transmission/reception of information with the outside, described later, may be used. Meanwhile, the biometric information receiving unit 21 generates for example the original image 41 by performing a prescribed process described above.

The frequency conversion unit 23 performs frequency conversion of for example the original image 41 that has been subjected to a prescribed process (S112). The feature amount extracting unit 27 performs polar coordinate conversion of the particular frequency component of amplitude information in the frequency information subjected to the frequency conversion in S111 and performs the raster scan, to generate the frequency feature vector 51 on the basis of the original image 41 (S113).

The edge extracting unit 95 performs an edge extracting process by a Sobel filter or the like to the original image 41, and generates an edge image 101 for example (S114). The frequency conversion unit 23 performs frequency conversion of for example the edge image 101 extracted by the edge extracting unit 95, and generates a power spectrum image 103 for example (S115). The feature amount extracting unit 27 extracts the particular frequency component of the power spectrum image 103 for example, and by performing polar coordinate conversion and further performing the raster scan, generates a pseudo frequency feature vector 105 based on phase information (S116).

The feature amount combining unit 31 combines for example the extracted frequency feature vector 51 and the pseudo frequency feature vector 105 (S117), and may perform collation or registration of data, and terminates the process.

As described in detail above, in the biometric authentication apparatus 1 according to the second embodiment, the biometric information receiving unit 21 for example receives biometric information and extracts a fingerprint image, and the frequency conversion unit 23 performs frequency conversion of the fingerprint image. The feature amount extracting unit 27 extracts the particular frequency component of amplitude information in the frequency information that has been subjected to the frequency conversion, performs polar coordinate conversion and a process to lessen the discontinuity and the like, and extracts the frequency feature vector in one dimension by the raster scan.

Meanwhile, the edge extracting unit 95 performs edge detection in the original image 41. The frequency conversion unit 23 performs frequency conversion of information obtained by the edge detection. The feature amount extracting unit 27 generates the pseudo frequency feature vector based on phase information of the original image 41, on the basis of amplitude information in information subjected to frequency conversion. The feature amount combining unit 31 generates a feature vector by combining a frequency feature vector based on amplitude information in frequency information that is the fingerprint image subjected to frequency conversion, and at least one pseudo frequency feature vector described above.

The collating unit 33 performs biometric authentication with the generated biometric information. At this time, in the same manner as in the first embodiment, with reference to the biometric information DB 65, whether the generated feature vector is that of a user who has already been registered may be identified. Meanwhile, for example the length of the vector and the value of the component of biometric information registered in the biometric information DB 65 may be different from those in the first embodiment. The registering unit 35 may store generated information as biometric information DB 65 in the memory 15 or the external storage apparatus 11.

As described above, for example, phase information regarding an image of biometric information represents its local change of pixel values. Therefore, in an image that includes a characteristic line, phase information concentrates on the edge area of its line. Therefore, by generating an image subjected to edge detection, phase information may be made into space information. By performing DFT to the image and vectorizing the power spectrum, the phase information may be vectorized spuriously.

As described above, phase information relating to a characteristic line concentrates on an edge area of the original image. Using this characteristic, by extracting an edge area of the original image and vectorizing the edge image, the same effect as for the biometric authentication apparatus 1 according to the first embodiment may be obtained without performing the restoration of pseudo phase information by inverse DFT as in the first embodiment.

(Variation Example) Hereinafter, a variation example that may be applied to the biometric authentication apparatus 1 according to the first and second examples is explained. This variation example is a variation example of the processing by the feature amount extracting unit 27 such as S85 in the first embodiment and S113, S115 or the like in the second embodiment, and it is another example of the method for deciding the frequency band that represents the feature of a fingerprint. The other configurations are the same as those of the biometric authentication apparatus according to the first and second embodiments described above. Regarding the same configurations and actions as in the first and second embodiments, redundant explanations are omitted.

Figure 10:
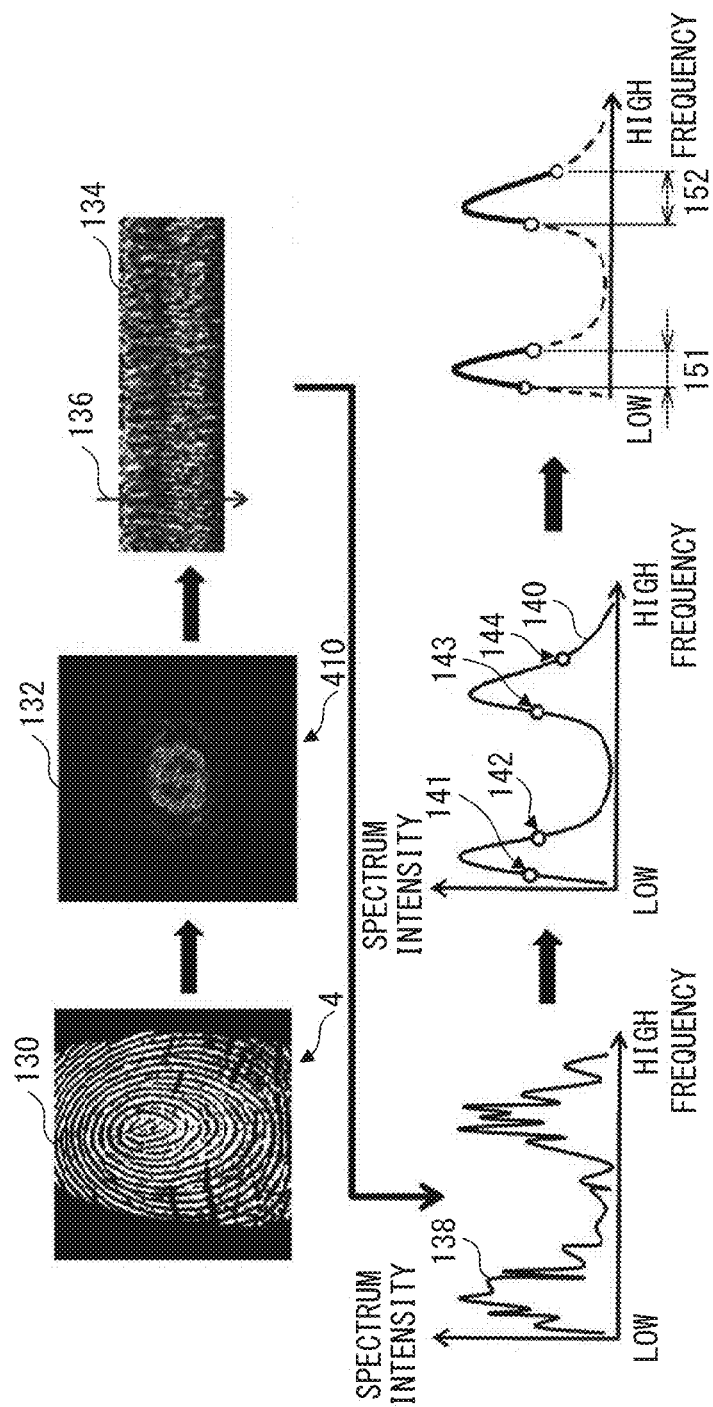
FIG. 10 is a diagram illustrating an example of a method for deciding a frequency band that represents the feature of a fingerprint according to a variation example.

FIG. 10 is a diagram illustrating an example of a method for deciding a frequency band that represents the feature of a fingerprint according to the present variation example. As illustrated in FIG. 3, an original image 130 is, for example, an image that the biometric information receiving unit 21 has received and that has been subjected to a process to extract the foreground. A power spectrum image 132 is an image obtained by frequency conversion of the original image 130.

A polar coordinate image 134 is an image obtained by polar coordinate conversion of the power spectrum image 141. In the first and second embodiments, the power spectrum of the particular frequency band is extracted to generate the polar coordinate image 49, but in the present variation example, the polar coordinate image is generated without limiting the frequency band.

FIG. 10 illustrates the flow of the process for selecting a particular frequency band that represents the feature of a fingerprint that is the subject. In this variation example, the feature amount extracting unit 27 extracts a frequency spectrum 138 corresponding to one or more particular directions specified in advance, from the polar coordinate image 134 as indicated by an arrow 136. The feature amount extracting unit 27 obtains an approximate curve 140 of the frequency spectrum 138, by performing curve approximation to the extracted frequency spectrum 138. Then, the feature amount extracting unit 27 obtains inflexion points 141-144 of the approximate curve 140, and on the basis of the inflexion points, selects a frequency band 151 corresponding to the pattern of the ridge line and the valley line, and a frequency band 152 corresponding to the edge pattern between the ridge line and the valley line. The feature amount extracting unit 27 may extract the frequency spectrum related to the frequency areas 151, 153 obtained as described above, and may further generate a polar coordinate image, and may extract the frequency feature vector or the pseudo frequency feature vector.

In addition, the feature amount extracting unit 27 may, for example, extract the selected frequency band and the frequency spectrum in the frequency band relating to each direction set in advance, and may generate a polar coordinate image. The process after the generation of the polar coordinate is the same as the process explained in the first embodiment or the second embodiment.

By using the process to select the frequency band explained in this variation example, it becomes possible to extract the feature vector that better matches the characteristics of biometric information, and to further prevent a decrease in the authentication accuracy.

Meanwhile, the process to select the frequency band is not limited to the one explained in the first and second embodiments or the variation example, and may be another method. In addition, for example, an example to select particular bands respectively for particular directions of the polar coordinate image, and a method to select a large number of frequency bands according to the direction component for example, may be adopted.

According to the image processing apparatus and the image processing method and program, it becomes possible to prevent a decrease in the authentication accuracy while suppressing an increase in the authentication information amount in the image processing in biometric authentication.

Meanwhile, the present invention is not limited to the embodiments described above, and may take various configurations or embodiments without departing from the scope of the present invention. For example, in the first and second embodiments and the variation example, the explanation is given with a fingerprint as the example of biometric information, but this is not a limitation; a palm print, a blood vessel pattern and others that are detected as an image may be applied.

While an example in which the threshold used for separating the foreground and the background is the same for the entire image has been explained, another example where a threshold set individually for each block is also possible. For frequency conversion, Fast Fourier Transform and the like may be used. The feature amount based on amplitude information of frequency conversion information is not limited to the one described above, and an example in which another calculating method is used may also be adopted. For example, the method for deciding the particular frequency band is not limited to the one described above, and for example, a plurality of areas whose frequency spectrum is equal to or larger than a prescribed value may also be used. In that case, the frequency area used may be registered as the biometric information DB 65, and may be collated at the time of the collation.

Variation is also possible for a method for extracting the component of each vector in the method for generating the frequency feature vector and the pseudo frequency feature vector, such as to extract the component only from a part of the polar coordinate image, for example. In addition, an example in which the feature amount combining unit 31 generates the feature vector by arranging and combining the frequency feature vector and the pseudo frequency feature vector sequentially has been explained, but for example, the order and method of arranging are not limited to this.

As the control apparatus 3 of the biometric authentication apparatus according to the first or the second embodiments and their variation examples described above, a standard computer may also be used. Here, an example of a computer applied in common to make the computer perform operations of the image processing method according to the first or the second embodiment and their variation examples described above is explained. FIG. 11 is a block diagram illustrating an example of the hardware configuration of a standard computer. As illustrated in FIG. 11, in a computer 300, a Central Processing Unit (CPU) 302, a memory 304, an input apparatus 306, an output apparatus 308, an external storage apparatus 312, a medium driving apparatus 314, a network connection apparatus and the like are connected through a bus 310.

The CPU 302 is an operation processing apparatus that controls the operations of the entirety of the computer 300. The memory 304 is a storing unit for storing a program that controls the operations of the computer 300, and to be used as a work area as needed when the program is executed. The memory 304 is a Random. Access Memory (RAM), a Read Only Memory (ROM), or the like for example. The input apparatus 306 is an apparatus that obtains, when operated by the user of the computer, an input of various information from the user associated with the operation detail and that transmits the obtained input information to the CPU 302, and it is for example a keyboard apparatus, a mouse apparatus, and the like. The output apparatus 308 is an apparatus that outputs the result of the processing by the computer 300, and it includes a display apparatus and the like. For example, the display apparatus displays a text and an image according to display data transmitted by the CPU 302.

The external storage apparatus 312 is a storage apparatus such as a hard disk for example, and it is an apparatus for storing various control programs executed by the CPU 302, obtained data, and the like. The medium driving apparatus 314 is an apparatus for performing writing and reading to/from a portable recording medium 316. The CPU 302 may be configured to perform various control processes by reading and executing a prescribed control program recorded in the portable recording medium 316 through the medium driving apparatus. The portable recording medium 316 is, for example, a Compact Disc (CD)-Rom, a Digital Versatile Disc (DVD), a Universal Serial Bus (USB) memory, and the like. The network connection apparatus 318 is an interface apparatus that controls various data which transmitted or received between the network connection apparatus 318 and outside in a wired or wireless manner. The bus 310 is a communication path that connects the various apparatuses and the like described above with each other and performs data exchange.

A program for making a computer execute the image processing method according to the first or the second embodiment or the variation examples is stored in the external storage apparatus 312 for example. The CPU 302 reads out the program from the external storage apparatus 312 and makes the computer 300 execute the operations of the image processing. At this time, first, a control program for making the CPU 302 perform the process of the image processing is created and stored in the external storage apparatus 312. Then, a prescribed instruction is given from the input apparatus 306 to the CPU 302, so that the control program is read out from the external storage apparatus 312 and executed. In addition, this program may also be stored in the portable recording medium 316.

In the first or the second embodiment, or the variation examples, the original images 41, 130 are an example of image information, and the power spectrum images 43, 132 are an example of amplitude information included in the first frequency information, and the inverse conversion image 55 and the edge image 101 are an example of the first phase component image. The phase information image 53 is an example of the first phase information, and the power spectrum image 57 and the power spectrum image 103 are an example of amplitude information included in the second frequency information, and the phase information image 61 is an example of the second phase information. Meanwhile, the inverse conversion image generated on the basis of the phase information image 61 is an example of the second phase component image.

In addition, the restoring unit 25 and the edge extracting unit 9 are an example of the phase information extracting unit, and the information amount calculating unit 29 is an example of the calculating unit. The frequency feature vector 51 is an example of the first feature vector, and the pseudo frequency feature vector 59 is an example of the second feature vector.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An image processing apparatus, comprising:
   a processor configured to execute a process comprising:
   receiving image information including biometric information;
   converting the image information into first frequency information;
   extracting, from the image information, a first phase component image representing a phase component included in the image information, by performing inverse frequency conversion of first phase information, included in the first frequency information, into space information;
   converting the first phase component image into second frequency information;
   extracting a first feature vector and a second feature vector respectively on the basis of amplitude information of the first frequency information and the second frequency information determined in advance; and
   combining the first feature vector and the second feature vector on the basis of a prescribed rule.

2. The image processing apparatus according to claim 1, wherein the process further including:
   calculating a total sum of amplitude information included in the second frequency information;
   repeating a procedure, when the total sum is larger than a prescribed amount, wherein the procedure includes extracting a second phase component image by performing inverse frequency conversion of second phase information ,included in the second frequency information, into space information,
   converting the second phase component image into third frequency information, and extracting a third feature vector on the basis of amplitude information of the particular frequency band of the third frequency information; and combining the extracted first through third feature vectors on the basis of a prescribed rule.

3. The image processing apparatus according to claim 1, wherein the frequency band is a frequency area in which feature information of the image information concentrates and the processor regards first through third vector strings obtained by extracting respective amplitude information in the frequency band included in the first through third frequency information in an order on the basis of a frequency and a phase as the first through third feature vectors respectively.

4. The image processing apparatus according to claim 1, wherein the frequency band is determined according to an inflexion point of a change in an order of the extracted amplitude information, with respect to the order for extracting amplitude information included in the first frequency information on the basis of at least one of the frequency or the phase.

5. An image processing method, comprising:
receiving, by a processor, image information including biometric information;
converting, by the processor, the image information into first frequency information;
extracting, by the processor, from the image information, a first phase component image representing a phase component included in the image information, by performing inverse frequency conversion of first phase information, included in the first frequency information, into space information;
converting, by the processor, the first phase component image into second frequency information;
extracting, by the processor, a first feature vector and a second feature vector respectively on the basis of amplitude information of the first frequency information and the second frequency information determined in advance; and
combining, by the processor, the first feature vector and the second feature vector on the basis of a prescribed rule.

6. The image processing method according to claim 5, wherein a total sum of amplitude information included in the second frequency information is further calculated;
a procedure is repeated, when the total sum is larger than a prescribed amount, in which extracting a second phase component image by performing inverse frequency conversion of second phase information included in the second frequency information into space information, converting the phase component image into third frequency information, and extracting a third feature vector on the basis of amplitude information of the particular frequency band of the third frequency information; and
the extracted first through third feature vectors are combined on the basis of a prescribed rule.

7. The image processing method according to claim 5, wherein the frequency band is a frequency area in which feature information of the image information concentrates; and
first through third vector strings obtained by extracting respective amplitude information in the frequency band included in the first through third frequency information in an order on the basis of a frequency and a phase are regarded as the first through third feature vectors respectively.

8. The image processing method according to claim 5, wherein the frequency band is determined according to an inflexion point of a change in an order of the extracted amplitude information, with respect to the order for extracting amplitude information included in the first frequency information on the basis of at least one of the frequency or the phase.

9. A non-transitory computer-readable recording medium having stored therein a program for causing a computer to execute a process comprising:
receiving image information including biometric information;
converting the image information into first frequency information;
extracting, from the image information, a first phase component image representing a phase component included in the image information, by performing inverse frequency conversion of first phase information, included in the first frequency information, into space information;
converting the first phase component image into second frequency information;
extracting a first feature vector and a second feature vector respectively on the basis of amplitude information of the first frequency information and the second frequency information determined in advance; and
combining the first feature vector and the second feature vector on the basis of a prescribed rule.

10. The non-transitory computer-readable recording medium having stored therein a program according to claim 9, wherein a comparison collation with a feature vector registered in advance is further performed to make a determination as to whether a person is a registered user.

11. A biometric authentication apparatus comprising:
a processor configured to execute a process including:
receiving image information including biometric information;
extracting, from the image information, a first phase component image representing a phase component included in the image information;
converting the image information into first frequency information, and converts the first phase component image into second frequency information;
extracting a first feature vector and a second feature vector respectively on the basis of amplitude information of the first frequency information and the second frequency information determined in advance;
combining the first feature vector and the second feature vector on the basis of a prescribed rule; and
performing a comparison collation with a feature vector registered in advance to make a determination as to whether a person is a registered user.

12. A biometric authentication method comprising:
receiving, by a processor, image information including biometric information;
extracting, by the processor, from the image information, a first phase component image representing a phase component included in the image information;
converting, by the processor, the image information into first frequency information, and also converting the first phase component image into second frequency information;
extracting, by the processor, a first feature vector and a second feature vector respectively on the basis of amplitude information of the first frequency information and the second frequency information determined in advance;
combining, by the processor, the first feature vector and the second feature vector on the basis of a prescribed rule; and performing, by the processor, a comparison collation with a feature vector registered in advance to make a determination as to whether a person is a registered user.

* * * * *